(12) United States Patent
Enzinna

(10) Patent No.: US 6,732,438 B2
(45) Date of Patent: May 11, 2004

(54) ROTARY POSITION SENSOR

(75) Inventor: Donald John Enzinna, Lockport, NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/114,210

(22) Filed: Apr. 2, 2002

(65) Prior Publication Data
US 2003/0182809 A1 Oct. 2, 2003

(51) Int. Cl.⁷ .................................................. G01B 5/24
(52) U.S. Cl. ........................ 33/1 PT; 33/1 N; 33/534
(58) Field of Search ............................ 33/1 PT, 1 N, 33/534; 73/118.1, 1, 1.175

(56) References Cited

U.S. PATENT DOCUMENTS

| | | | | |
|---|---|---|---|---|
| 5,359,884 A | * | 11/1994 | Fey et al. | 33/1 N |
| 5,403,243 A | * | 4/1995 | Behrens | 33/1 PT |
| 5,930,905 A | * | 8/1999 | Zabler et al. | 33/1 PT |
| 5,984,225 A | | 11/1999 | Enzinna | 242/415.1 |
| 6,246,232 B1 | * | 6/2001 | Okumura | 324/207.2 |
| 6,367,337 B1 | * | 4/2002 | Schlabach | 73/862.331 |
| 6,481,272 B1 | * | 11/2002 | Kieselbach | 33/1 PT |
| 6,507,188 B1 | * | 1/2003 | Dilger et al. | 33/1 PT |
| 6,524,209 B2 | * | 2/2003 | Ito et al. | 33/1 PT |

* cited by examiner

Primary Examiner—G. Bradley Bennett
Assistant Examiner—Yaritza Guadalupe
(74) Attorney, Agent, or Firm—Patrick M. Griffin

(57) ABSTRACT

A rotary position sensor for an rotating shaft includes a planetary gear set and a potentiometer. The planetary gear set is coupled to the rotating shaft. The potentiometer is coupled to the rotating shaft and the planetary gear set and is adapted to measure a rotary position of the rotating shaft and responsively generates a position signal. The planetary gear set is adapted to reduce multiple rotations of the rotating shaft to less than a full rotation of the potentiometer.

16 Claims, 5 Drawing Sheets

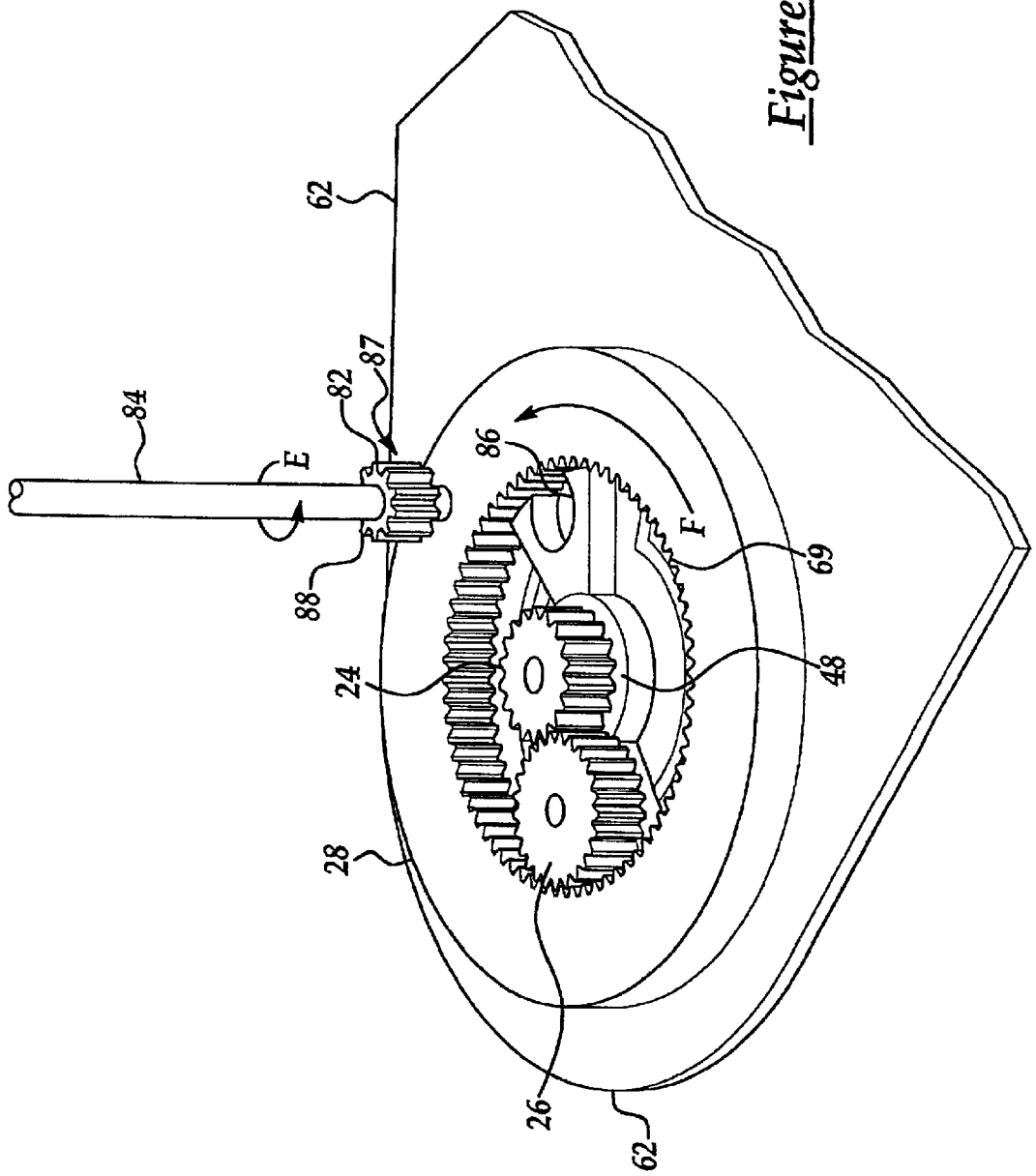

ROTARY POSITION SENSOR

FIELD OF THE INVENTION

The present invention related generally to position sensors, and more particularly, to a rotary position sensor having potentiometer and a planetary gear set.

BACKGROUND OF THE INVENTION

Rotary actuators have many applications. For example in the automotive industry, rotary actuators may be used in seat positioning mechanisms, mirror positioning mechanisms, and air conditioning and ventilation systems.

A relatively recent trend in automotive air conditioning systems has been the replacement of conventional, swinging flapper door valves with flexible film belts. A run of flexible film is rolled back and forth between a take up roller and a drive roller. A valve in the form of a window in the belt covers and uncovers an air passage within a housing of the system, allowing air through in direct proportion to the degree that the opening is uncovered. The result is more predictable control of airflow rates, as well as a potentially more compact system.

One advantage of the conventional, swinging flapper door is that it swings over less than a full turn, and it is therefore relatively easy to monitor its position. One known device is a potentiometer, in which a wiper that turns with the flapper door shaft wipes along an annular ring, back and forth, creating a changing resistance. The potentiometer works only over a full (or less than) 360 degrees, but that comports with the operation of the swinging flapper doors.

In contrast, the rollers that run the film belt must move through multiple turns. In order to use a potentiometer to measure the actuator position, a series of reduction gears may be used to step down the multiple turns of the belt roller into a single turn of the potentiometer. However, the potential exists for the potentiometer to become mis-aligned relative to the drive mechanism when the various gears are removed and replaced, such as during servicing. Thus misalignment will not be easily visible to the operator, but will throw off the position indicating function of the potentiometer.

One attempt to overcome this problem is described in U.S. patent application Ser. No. 09/652,246 filed Aug. 31, 2000 by inventor Donald John Enzinna. (now U.S. patent N/A). This system uses a set of reducing gears and a slip clutch for alignment of the system. However, this system does not allow the sensor to be manually calibrated.

Another problem with prior art sensors is that the sensor is relatively large.

The present invention is aimed at one or more of the problems as set forth above.

SUMMARY OF THE INVENTION AND ADVANTAGES

In one aspect of the present invention, a rotary position sensor for a rotating shaft is provided. The rotary position sensor includes a planetary gear set and a potentiometer. The planetary gear set is coupled to the shaft. The potentiometer is coupled to the rotating shaft and the planetary gear set and is adapted to measure a rotary position of the rotating shaft and responsively generate a position signal. The planetary gear set is adapted to reduce multiple rotations of the rotating shaft to less than a full rotation of the potentiometer.

In another aspect of the present invention, a rotary position sensor for a rotating shaft is provided. The rotating shaft is rotatably coupled to a housing. The rotary position sensor includes a planetary gear set and a potentiometer. The planetary gear set is coupled to the shaft and includes a pinion gear, a planet gear, and a ring gear. The pinion gear is coupled to the rotating shaft. The planet gear is engagingly coupled to the pinion gear. The ring gear is coupled to the housing and is engagingly coupled to the planet gear. The potentiometer is coupled to the rotating shaft and the planetary gear set and is adapted to measure a rotary position of the rotating shaft and responsively generate a position signal. The potentiometer includes a printed circuit board connected to the housing and having a PC board aperture. The potentiometer also includes a thick film resistor, a stop, and a wiper. The thick film resistor is located on a first side of the printed circuit board and has first and second ends and a generally circular shape. The stop is mounted to the printed circuit board between the first and second ends of the thick film resistor. The wiper is connected to an under side of the carrier and is in physical and electrical contact with the thick film resistor. The planetary gear set is adapted to reduce multiple rotations of the rotating shaft to less than a full rotation of the potentiometer.

BRIEF DESCRIPTION OF THE DRAWINGS

Other advantages of the present invention will be readily appreciated as the same becomes better understood by reference to the following detailed description when considered in connection with the accompanying drawings wherein:

FIG. 6 is a diagrammatic illustration of a rotary position sensor of FIG. 2, having a potentiometer, a planetary gear set and an adjustment tool, according to an embodiment of the present invention; and, FIG. 7 is a diagrammatic illustration of a ring gear of a planetary gear for use in the rotary position sensor of FIG. 2, according to another embodiment of the present invention.

DETAILED DESCRIPTION OF THE PREFERRED EMBODIMENT

Figure 1:
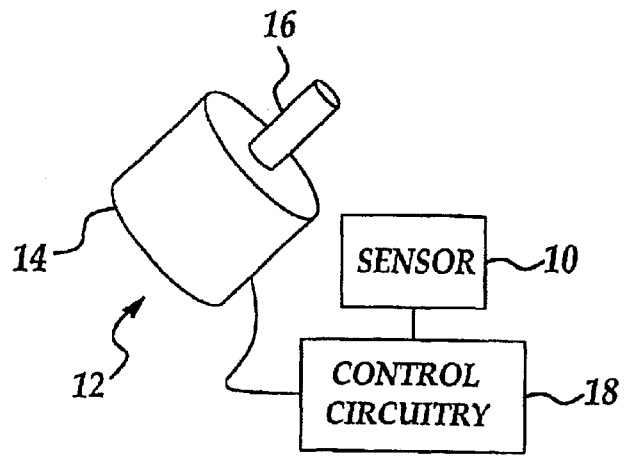
FIG. 1 is a diagrammatic illustration of a rotary actuator, control circuitry, and a rotary position sensor, according to an embodiment of the present invention.
Figure 2:
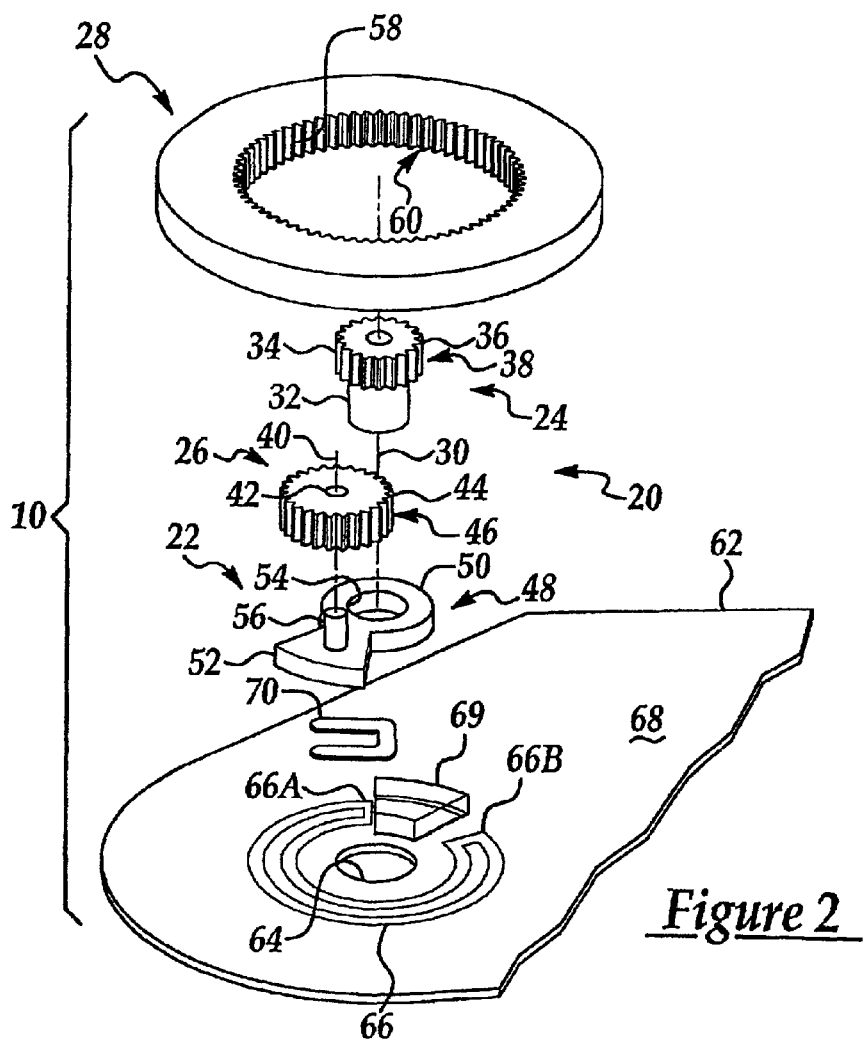
FIG. 2 is a diagrammatic illustration of the rotary position sensor of FIG. 1 in an unassembled condition, having a potentiometer and a planetary gear set, according to an embodiment of the present invention.

With reference to the drawings and in operation, the present invention provides a rotary position sensor 10 for a rotating shaft 16. In one embodiment, the rotating shaft 16 is part of an actuator 12. However, the present invention is not limited to use with an actuator. With specific reference to FIG. 1, the actuator 10 includes a housing 14 and a rotating shaft 16 rotatably coupled to the housing 14. The sensor 10 senses a position of the rotating shaft 16 and generates a position signal indicative of the sensed position. Control circuitry 18 receives the position signal and controls actuation of the actuator 12. Examples of applications of the actuator 12 include seat positioning mechanisms, mirror positioning mechanisms, and air conditioning and ventilation systems. However, it should be noted that the present invention has broad applicability and is not limited to any such application.

With reference to FIGS. 2–5, the sensor 10 includes a planetary gear set 20 coupled to the shaft 16 of the actuator 12. The sensor 10 also includes a potentiometer 22. The planetary gear set 20 acts to reduce multiple rotations of the shaft 16 of the actuator 12 to a full or less than a single rotation of the potentiometer 22 (see below).

The planetary gear set 20 includes a pinion gear 24, a planet gear 26, and a ring gear 28. The pinion gear 24 has a first axis 30, an insert portion 32 and a gear portion 34. The insert portion 32 and the gear portion 34 are centered on the first axis 30. The gear portion also has a circular first outer edge 36. The pinion gear 24 is coupled to the rotating shaft 16 and is adapted to rotate with rotation of the rotating shaft 16. The gear portion 34 includes a plurality of first teeth 38 along the first outer edge 36.

The planet gear 26 has a second axis 40, a first aperture 42, and a circular second outer edge 44. The first aperture 42 and the circular second outer edge 44 are centered on the second axis 40. The second outer edge 44 includes a plurality of second teeth 46, which are adapted to engage the first teeth 38.

A carrier 48 has a first portion 50 and a second portion 52. The first portion 50 includes a second aperture 54 and the second portion 52 includes a shaft 56. The second aperture 54 is adapted to receive the insert portion 32 of the pinion gear 24. The planet gear 26 is adapted to receive the shaft 56 of the carrier 48.

The ring gear 28 is coupled to the housing 14 of the actuator 12. The ring gear 28 includes a circular inner edge 58 with a plurality of third teeth 60. The third teeth are adapted to engage the second teeth 46. The planetary gear set 20 and the potentiometer 22 may be inside or outside of the housing 14 of the actuator 12.

In one embodiment of the present invention, the potentiometer 22 includes a printed circuit (PC) board 62 connected to the housing 14. The PC board 62 includes an aperture 64. The potentiometer 22 includes a thick film resistor 66 located on a first side 68 of the printed circuit board 62. The resistor 66 includes first and second ends 66A, 66B and has a generally circular shape.

The potentiometer 22 also includes a stop 69 and a wiper 70. The stop 69 is mounted to the printed circuit board 62 between the first and second ends 66A, 66B of the thick film resistor 66. The wiper 70 is connected to an under side of the carrier 48. The wiper 70 is in physical and electrical connection with the thick film resistor 66.

Figure 3:
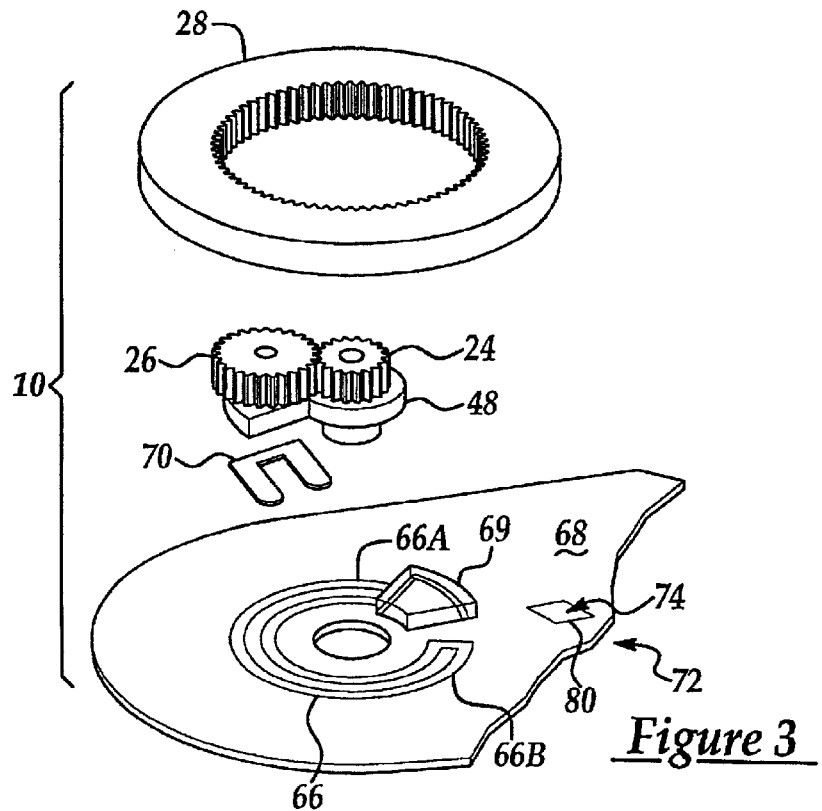
FIG. 3 is a diagrammatic illustration of a portion of the rotary position sensor of FIG. 2, showing a partially assembled view of the planetary gear set, according to an embodiment of the present invention.
Figure 4:
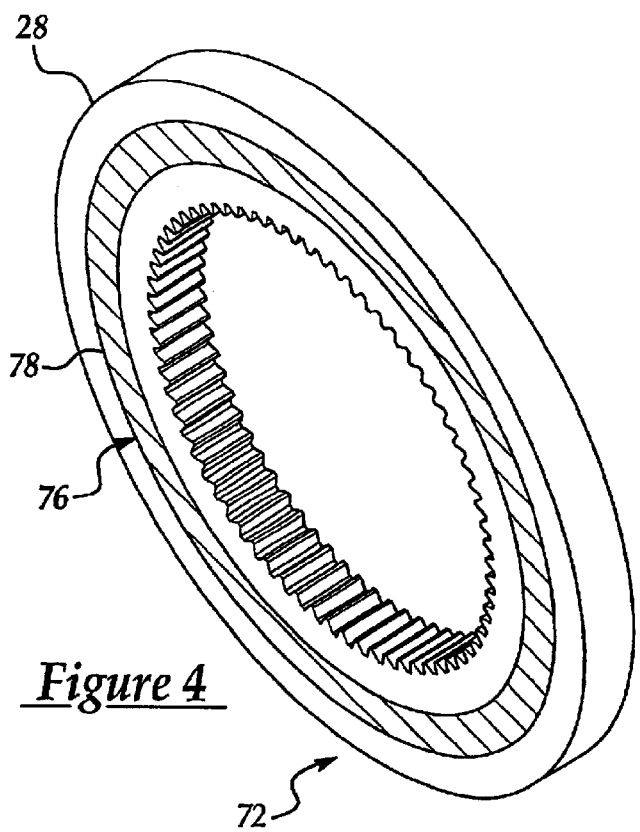
FIG. 4 is a diagrammatic illustration of a ring gear of the planetary gear set of FIG. 2, according to an embodiment of the present invention.

With reference to FIGS. 3 and 4 in one aspect of the present embodiment, the ring gear 28 is coupled to the housing 14 by a friction brake 72. The friction brake 72 is adapted to hold the ring gear 28 in a fixed relationship relative to the housing 14 and to allow the ring gear 28 to break free and rotate when a predetermined amount of torque is applied thereto.

In one aspect of the present invention, the friction brake 72 includes first and second elements 74, 76. In one embodiment, the first element 76 is connected to the ring gear 28 and the second element 74 is connected to either the potentiometer 22 or the housing 14. In one embodiment, one of the first and second elements is a friction pad and the other of the first and second elements is a resilient member.

In the illustrated embodiment, a generally circular friction pad 78 is connected to an under side of the ring gear 28 and a friction pad 80 is located on the surface 68 of the PC board 62.

In operation, as the rotating shaft 16 rotates, the pinion gear 24 and the wiper 70 rotate, thereby causing a change in the output of the potentiometer 24. Thus, the angle of the output shaft 16 and the mechanical load connected thereto can be precisely indicated by the output voltage of the potentiometer 22.

As discussed above, the pinion gear 24 is attached to the actuator output shaft 16. The insert portion 32 of the pinion 24 extends through the aperture 54 in the carrier 48 which in turn is allowed to rotate about the first axis 30 of the pinion gear 24. The ring gear 28 is located concentric with the first axis 30. Furthermore, the pinion gear 24 engages the planet gear 46. The planet 46 in turn engages the ring gear 28 in a planetary gear arrangement.

As discussed above, the ring gear 28 is furthermore held in a fixed relationship with the printed circuit board 62, but designed, through the friction brake 72, to break free and rotate when a predetermined level of torque is applied.

The combination of the carrier 48, the wiper 70 and the thick film resistor 64 collectively form the potentiometer 22.

Figure 5A:
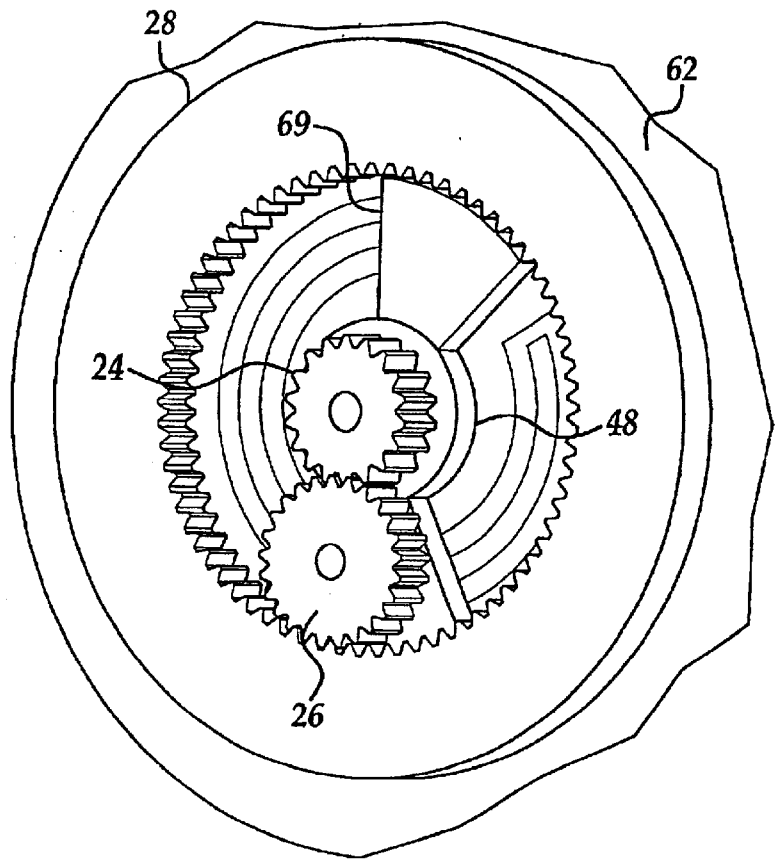
FIG. 5A is a diagrammatic illustration of the rotary position sensor of FIG. 2, showing a first assembled view of the planetary gear set, according to an embodiment of the present invention.
Figure 5B:
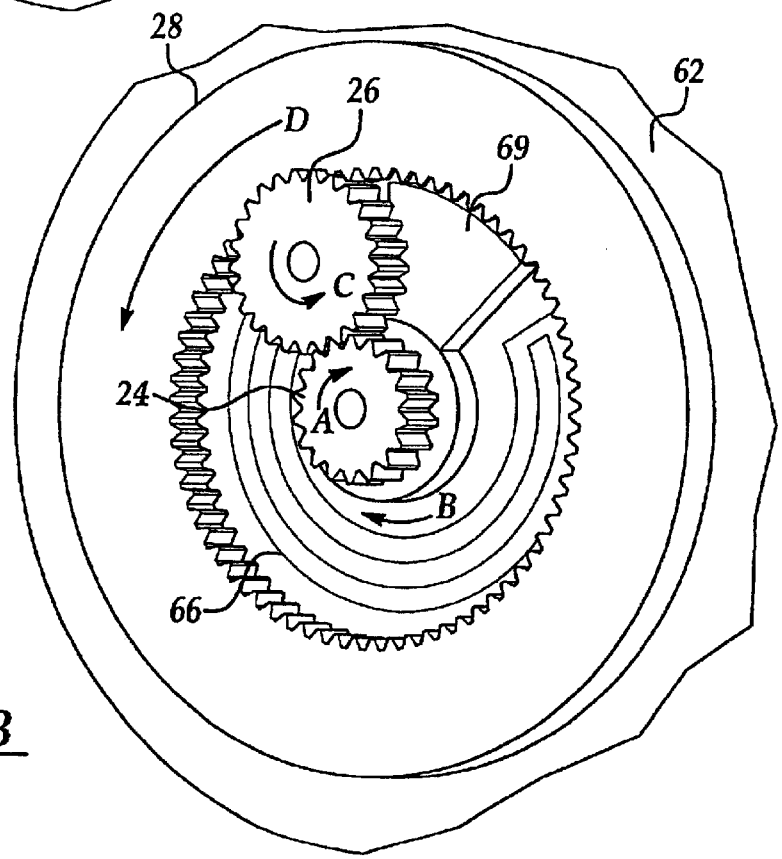
FIG. 5B is a diagrammatic illustration of the rotary position sensor of FIG. 2, showing a second assembled view of the planetary gear set, according to an embodiment of the present invention.

With specific reference to FIG. 5A, the planet gear 26 and the carrier 48 are shown in a mid-range position. The output of the potentiometer 22 is in proportion to the position of the carrier 48. Since the carrier 48 is driven by the planet gear 26 which is driven between the ring gear 28 and the pinion gear 24, the assembly becomes a multiple turn potentiometer 22 and is able to signal the exact position of the pinion gear 24 and hence the output shaft 16 of the actuator 12 over a range of several turns. The exact number of turns depends on the ratio of teeth between the pinion and outer ring gear as anyone familiar with planetary gear mechanisms will know.

In one embodiment, the planetary gear set 20 is adapted to self-align. With specific reference to FIG. 5B, the actuator output shaft 16 has rotated clockwise (as shown by the arrow labeled A). This has caused the planet gear 26 to rotate in the direction shown by arrow C which, by engaging with the heretofore stationary ring gear 28, has resulted in the rotation of the carrier 48 in the direction shown by arrow B. Contact has been made between the carrier 48 and the hard stop 69. At this point, the potentiometer 22 is constrained from further motion. This is desirable since the potentiometer 22 is at the end of it's range and continued motion would disengage the wiper 70 from the resistor 66 resulting in an ambiguous output. It can now be seen that continued rotation of the actuator output shaft 16 and pinion gear 24 will result in a torque on the ring gear 28 in the direction indicated by arrow D. Since the ring gear 28 is frictionally engaged relative to the PC board 62, it is possible to move the ring gear 28 in the direction shown once the level of torque has exceeded a threshold value. Once the direction of the actuator 16 changes, the carrier 48 will reverse and move away from the hard stop 69. The ring gear 28 will remain in the new position, held in place by the friction brake 72.

In another aspect of the present invention, an adjustment gear 82 is engagingly coupled to the ring gear 28 and is adapted to provide manual adjustment of the sensor 10.

In one embodiment the adjustment gear 82 is permanently connected to an adjustment tool 84 and is adapted to be inserted into an adjustment aperture 86 of the planetary gear set 20 (shown as part of the stop 69). In another embodiment, the adjustment gear 82 is permanently mounted to the stop 69. The adjustment tool 84 is adapted to be removable connected to the adjustment gear 82.

As shown, the adjustment gear 82 has a plurality of teeth 87 along a circular outer edge 88 which are adapted to engage with the third teeth 60 of the ring gear 28.

Figure 7:
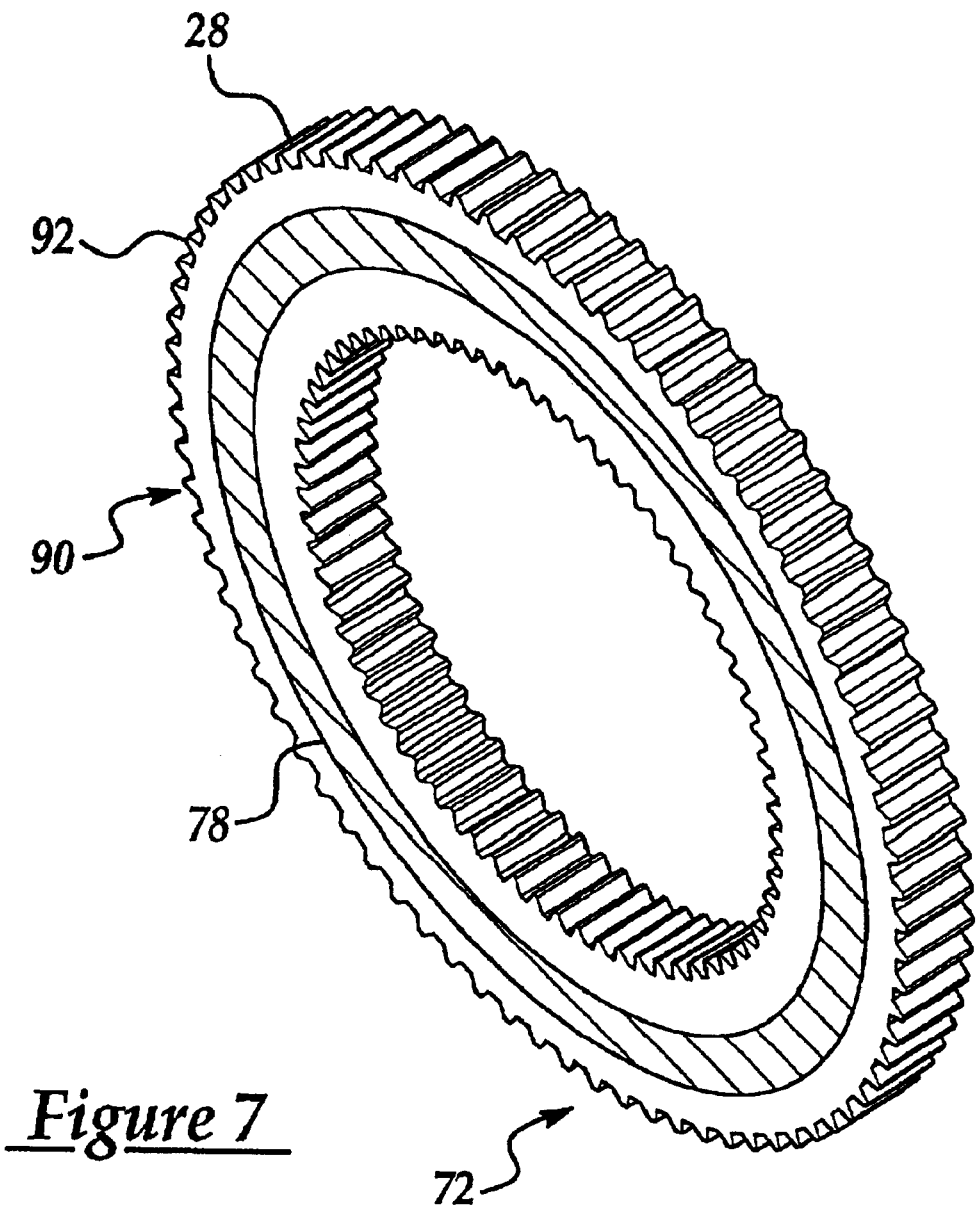

With reference to FIG. 7, in an alternative embodiment, the ring gear 28 has a plurality of teeth 90 along its outer edge 92. The teeth 87 of the adjustment gear 82 are adapted to engage the teeth 90 along the outer edge 82 of the ring gear.

The adjustment gear 82 provides a mechanical override feature which allows manual positioning and adjustment of the actuator assembly. The adjustment gear 82 engages the inner (or third) teeth 60 of the ring gear 28. In the illustrated embodiment of FIG. 6, the adjustment gear 82 is inserted in a adjustment aperture 86 of the stop 69, so as not to interfere with the movement of the planet gear 26 and the carrier 48.

Rotation of the adjustment tool 84, as shown by arrow E results in rotation of the ring gear 28 in the direction depicted by arrow F.

As the ring gear 28 is forced to move by the adjustment tool and gear 84,82 the carrier 48 and the wiper 70 will be moved since the pinion gear 24 is now stationary. This movement of the wiper 70 results in an electrical imbalance in the control circuitry 18 since the output voltage of the potentiometer 22 has changed. This will cause the actuator 12 to be turned on as the control circuitry 18 attempts to maintain the potentiometer wiper 70 in a fixed position. The actuator 12 can now be positioned anywhere in alignment with the fixed potentiometer position as set by the control circuitry control input. Thus, the system can be set at a known position and the actuator 12 manually operated until the actuator output matches the position set on the system control. Furthermore, the actuator 12 and control circuitry 18 will remain in alignment when the adjustment tool is removed.

This invention also includes the ability to self align the actuator 12 to a mechanical load. If the mechanical load operated by the actuator 12 is constrained to operate between fixed stops which cause the actuator 12 to stall without damage and the system is carefully designed so the mechanical movement of the load between the end stops corresponds exactly with the potentiometer end stops, it can be seen that the system will self align when the actuator 12 is driven sequentially between both extreme ends of travel. The system will further self align by driving in one direction only if the potentiometer 22 reaches the end stop prior to the mechanical load reaching it's end stop. The motor within the actuator 12 continues to drive the mechanical load while simultaneously driving the ring gear 28. When the actuator 12 reverses, the carrier 48 within the potentiometer 22 leaves the hard stop 69 at the same time the mechanical load leaves the mechanical stop. Thus the two are in a fixed and precise relationship.

Obviously, many modifications and variations of the present invention are possible in light of the above teachings. The invention may be practiced otherwise than as specifically described within the scope of the appended claims.

What is claimed is:

1. A rotary position sensor for a rotating shaft, comprising:
   a planetary gear set coupled to the shaft;
   a potentiometer coupled to the rotating shaft and the planetary gear set for measuring a rotary position of the rotating shaft and responsively generating a position signal, the planetary gear set for reducing multiple rotations of the rotating shaft to less than a full rotation of the potentiometer and an adjustment gear coupled to the planetary gear set for providing manual adjustment of the sensor.

2. A rotary position sensor, as set forth in claim 1, wherein the rotating shaft is rotatably coupled to a housing and the planetary gear set includes:
   a pinion gear having a first axis, an insert portion and a gear portion, the insert portion and the gear portion being centered on the first axis, the gear portion also having a circular first outer edge, the pinion gear being coupled to the rotating shaft and being adapted to rotate with rotation of the rotating shaft, the gear portion having a plurality of first teeth along the first outer edge;
   a planet gear having a second axis, a first aperture centered on the second axis, and a circular second outer edge centered on the second axis, the second outer edge having a plurality of second teeth, the second teeth being adapted to engage the first teeth;
   a carrier having a first portion and a second portion, the first portion having a second aperture and the second portion having a shaft, the second aperture being adapted to receive the insert portion of the pinion gear, the planet gear being adapted to receive the shaft of the carrier;
   a ring gear coupled to the housing and having a circular inner edge, the inner edge having a plurality of third teeth, the third teeth being adapted to engage the second teeth.

3. A rotary position sensor, as set forth in claim 1, wherein the rotating shaft is rotatably coupled to a housing and the planetary gear set includes:
   a pinion gear coupled to the rotating shaft;
   a planet gear engagingly coupled to the pinion gear; and,
   a ring gear coupled to the housing and being engagingly coupled to the planet gear.

4. A rotary position sensor, as set forth in claim 3, further comprising a friction brake coupled between the ring gear and the housing.

5. A rotary position sensor, as set forth in claim 4, wherein the friction brake is adapted to hold the ring gear in a fixed relationship relative to the housing and to allow the ring gear to break free and rotate when a predetermined amount of torque is applied to the ring gear.

6. A rotary position sensor, as set forth in claim 4, wherein the friction brake includes first and second elements, wherein the first element is connected to the ring gear and the second element is connected to one of the potentiometer and the housing.

7. A rotary position sensor, as set forth in claim 6, wherein one of the first and second elements is a friction pad and the other of the first and second elements is a resilient member.

8. A rotary position sensor, for a rotating shaft coupled to a housing comprising:
   a planetary gear set coupled to the shaft, the planetary gear set including a pinion gear coupled to the rotating shaft, a planet gear engagingly coupled to the pinion gear, and a ring gear coupled to the housing and being engagingly coupled to the planet gear;

a potentionmeter coupled to the rotating shaft for measuring a rotary position of the rotating shaft and responsively generating a position signal; and an adjustment gear engagingly coupled to the ring gear and being adapted to provide manual adjustment of the sensor.

9. A rotary position sensor, as set forth in claim 8, wherein the adjustment gear is connected to an adjustment tool and is adapted to be inserted into an adjustment aperture of the planetary gear set.

10. A rotary position sensor, as set forth in claim 8, further comprising an adjustment tool adapted to be connected to the adjustment gear.

11. A rotary position sensor, as set forth in claim 8, wherein the adjustment gear has a plurality of adjustment teeth along a circular outer edge.

12. A rotary position sensor, as set forth in claim 11, wherein the ring gear has a circular inner edge, the inner edge having a plurality of teeth, the teeth of the ring gear being adapted to engage the adjustment teeth.

13. A rotary position sensor, as set forth in claim 11, wherein the ring gear has a circular outer edge, the outer edge having a plurality of ring gear adjustment teeth, the ring gear adjustment teeth being adapted to engage the adjustment teeth of the adjustment gear.

14. A rotary position sensor for a rotating shaft, comprising:

a planetary gear set coupled to the shaft; and a potentiometer coupled to the rotating shaft and the planetary gear set for measuring a rotating position of the rotating shaft and responsively generating a position signal, wherein the planetary gear set is adapted to self-align.

15. A rotary sensor, for a rotating shaft rotatably coupled to a housing comprising:

a planetary gear set coupled to the shaft; and, a potentiometer coupled to the rotating shaft and the planetary gear set for measuring a rotating position of the rotating shaft and responsively generating a position signal, the potentiometer further includes:

a printed circuit board being connected to the housing and a having a PC board aperture;

a thick film resistor located on a first side of the printed circuit board and having first and second ends and a generally circular shape;

a stop mounted to the printed circuit board between the first and second ends of the thick film resistor;

a wiper connected to an under side of the carrier, the wiper being in physical and electrical connection with the thick film resistor.

16. A rotary position sensor for a rotation shaft, the rotating shaft being rotatably coupled to a housing, comprising:

a planetary gear set coupled to the shaft, the planetary gear set including:

a pinion gear coupled to the rotating shaft;

a planet gear engagingly coupled to the pinion gear; and, a ring gear coupled to the housing and being engagingly coupled to the planet gear; and, a potentiometer coupled to the rotating shaft and the planetary gear set and being adapted to measure a rotary position of the rotating shaft and responsively generate a position signal, wherein the potentiometer includes:

a printed circuit board being connected to the housing and a having a PC board aperture;

a thick film resistor located on a first side of the printed circuit board and having first and second ends and a generally circular shape;

a stop mounted to the printed circuit board between the first and second ends of the thick film resistor; and, a wiper connected an under side of the carrier, the wiper being in physical and electrical connection with the thick film resistor, wherein the planetary gear set being adapted to reduce multiple rotations of the rotating shaft to less than a full rotation of the potentiometer.

* * * * *